United States Patent
Fullerton et al.

(10) Patent No.: US 7,358,888 B2
(45) Date of Patent: Apr. 15, 2008

(54) SYSTEM AND METHOD FOR INTRUSION DETECTION USING A TIME DOMAIN RADAR ARRAY

(75) Inventors: Larry W. Fullerton, Brownsboro, AL (US); James L. Richards, Fayetteville, TN (US)

(73) Assignee: Time Domain, Huntsville, AL (US)

( * ) Notice: Subject to any disclaimer, the term of this patent is extended or adjusted under 35 U.S.C. 154(b) by 883 days.

(21) Appl. No.: 10/806,131

(22) Filed: Mar. 23, 2004

(65) Prior Publication Data

US 2007/0182618 A1    Aug. 9, 2007

Related U.S. Application Data

(60) Continuation of application No. 09/767,131, filed on Jan. 23, 2001, now Pat. No. 6,400,307, which is a continuation of application No. 09/332,502, filed on Jun. 14, 1999, now Pat. No. 6,177,903, which is a division of application No. 09/332,503, filed on Jun. 14, 1999, now Pat. No. 6,218,979.

(51) Int. Cl.
   *G01S 13/42* (2006.01)
(52) U.S. Cl. .............................. 342/57; 342/21; 342/22; 342/27; 342/28; 342/58; 342/59; 342/107; 342/113; 342/114; 342/125; 342/126; 342/146; 342/147
(58) Field of Classification Search ................... 342/21, 342/22, 27, 28, 57–59, 107, 108, 113, 114, 342/125, 126, 133, 139, 146, 147
   See application file for complete search history.

(56) References Cited

U.S. PATENT DOCUMENTS 4,083,049 A    4/1978  Mattern et al. ............... 342/28

(Continued)

FOREIGN PATENT DOCUMENTS

DE    196 12 579 A1    10/1997

(Continued)

OTHER PUBLICATIONS

"Ultrawideband radar", Taylor, J.D. Microwave Symposium Digest, 1991., IEEE MTT-S International Jul. 10-14, 1991 pp. 367-370 vol. 1.*

(Continued)

*Primary Examiner*—John B Sotomayor
(74) *Attorney, Agent, or Firm*—Venable LLP; Robert S. Babayi

(57) ABSTRACT

A system and method for highly selective intrusion detection using a sparse array of time modulated ultra wideband (TM-UWB) radars. Two or more TM-UWB radars are arranged in a sparse array around the perimeter of a building. Each TM-UWB radar transmits ultra wideband pulses that illuminate the building and the surrounding area. Signal return data is processed to determine, among other things, whether an alarm condition has been triggered. High resolution radar images are formed that give an accurate picture of the inside of the building and the surrounding area. This image is used to detect motion in a highly selective manner and to track moving objects within the building and the surrounding area. Motion can be distinguished based on criteria appropriate to the environment in which the intrusion detection system operates.

46 Claims, 14 Drawing Sheets

U.S. PATENT DOCUMENTS

| | | | |
|---|---|---|---|
| 4,622,540 A | 11/1986 | Guscott et al. | 340/531 |
| 4,641,317 A | 2/1987 | Fullerton | 375/1 |
| 4,727,593 A | 2/1988 | Goldstein | 455/605 |
| 4,743,906 A | 5/1988 | Fullerton | 342/27 |
| 4,813,057 A | 3/1989 | Fullerton | 375/37 |
| 4,907,001 A | 3/1990 | Harmuth | 342/159 |
| 4,979,186 A | 12/1990 | Fullerton | 375/23 |
| 5,057,846 A | 10/1991 | Harmuth | 342/204 |
| 5,134,408 A | 7/1992 | Harmuth | 342/21 |
| 5,148,174 A | 9/1992 | Harmuth | 342/21 |
| 5,265,121 A | 11/1993 | Stewart | 375/99 |
| 5,361,070 A | 11/1994 | McEwan | 342/21 |
| 5,363,108 A | 11/1994 | Fullerton | 342/27 |
| 5,457,394 A | 10/1995 | McEwan | 324/642 |
| 5,465,094 A | 11/1995 | McEwan | 342/28 |
| 5,510,800 A | 4/1996 | McEwan | 342/387 |
| 5,512,834 A | 4/1996 | McEwan | 324/642 |
| 5,519,400 A | 5/1996 | McEwan | 342/28 |
| 5,521,600 A | 5/1996 | McEwan | 342/27 |
| 5,573,012 A | 11/1996 | McEwan | 128/782 |
| 5,576,627 A | 11/1996 | McEwan | 324/639 |
| 5,589,838 A | 12/1996 | McEwan | 342/387 |
| 5,661,490 A | 8/1997 | McEwan | 342/387 |
| 5,668,555 A | 9/1997 | Starr | 342/179 |
| 5,677,927 A | 10/1997 | Fullerton et al. | 375/200 |
| 5,687,169 A | 11/1997 | Fullerton | 370/324 |
| 5,757,320 A | 5/1998 | McEwan | 342/387 |
| 5,766,208 A | 6/1998 | McEwan | 600/595 |
| 5,767,953 A | 6/1998 | McEwan | 356/5.01 |
| 5,774,091 A | 6/1998 | McEwan | 342/387 |
| 5,832,035 A | 11/1998 | Fullerton | 375/210 |
| 6,026,125 A | 2/2000 | Larrick, Jr. et al. | 375/295 |
| 6,067,040 A | 5/2000 | Puglia | 342/134 |
| 6,114,956 A * | 9/2000 | Van Genechten | 340/552 |
| 6,177,903 B1 * | 1/2001 | Fullerton et al. | 342/28 |
| 6,218,979 B1 * | 4/2001 | Barnes et al. | 342/28 |
| 6,400,307 B2 * | 6/2002 | Fullerton et al. | 342/28 |
| 6,667,724 B2 * | 12/2003 | Barnes et al. | 343/893 |
| 2001/0035837 A1 * | 11/2001 | Fullerton et al. | 342/28 |
| 2002/0000916 A1 * | 1/2002 | Richards | 340/572.1 |
| 2003/0052776 A1 * | 3/2003 | Richards | 340/539 |
| 2003/0071733 A1 * | 4/2003 | Hall et al. | 340/573.1 |
| 2004/0027270 A1 * | 2/2004 | Fullerton et al. | 342/28 |
| 2005/0083199 A1 * | 4/2005 | Hall et al. | 340/552 |
| 2006/0152404 A1 * | 7/2006 | Fullerton et al. | 342/28 |
| 2007/0182618 A1 * | 8/2007 | Fullerton et al. | 342/28 |

FOREIGN PATENT DOCUMENTS

| | | |
|---|---|---|
| EP | 0 744 629 A1 | 11/1996 |
| WO | WO 99/04285 | 1/1999 |

OTHER PUBLICATIONS

Anderson, F. et al., "Ultra-wideband beamforming in sparse arrays", IEE Proceedings-H, vol. 138, No. 4, Aug. 1991, 8 pages.

Skolnik, M.I., Introduction to Radar Systems, McGraw-Hill, 1980, pp. 553-560.

Frazier, "Surveillance Through Walls and Other Opaque Materials," *IEEE 1996 National Radar Conference*, Ann Arbor, MI, May 13-16, 1996, pp. 27-31.

* cited by examiner

410

SYSTEM AND METHOD FOR INTRUSION DETECTION USING A TIME DOMAIN RADAR ARRAY

RELATED APPLICATIONS

This application is a continuation of U.S. patent application Ser. No. 09/767,131, filed Jan. 23, 2001 (issued as U.S. Pat. No. 6,400,307), which is a continuation of U.S. application Ser. No. 09/332,502, filed Jun. 14, 1999 (issued as U.S. Pat. No. 6,177,903). This application is related to U.S. patent application Ser. No. 09/332,503 (issued as U.S. Pat. No. 6,218,979), entitled "Wide Area Time Domain Radar Array", which is incorporated herein by reference.

BACKGROUND OF THE INVENTION

1. Field of the Invention

The present invention relates generally to radar motion detection, and more particularly to using a sparse array of time modulated ultra wideband radars for highly selective intrusion detection.

2. Related Art

Today, many homes and businesses employ surveillance systems for intrusion detection. Consumers have spent billions of dollars on home security systems over the last few years, and the number of homes with security systems has increased by almost half. These systems vary dramatically in sophistication and cost, but most include perimeter sensors on outside doors and windows, motion detectors in key inside areas, a control unit to interpret and respond to signals from the sensors, and a siren or other alert mechanism. Most are connected to a central monitoring station, which can notify the police in the event something triggers one of the sensors.

Conventional intrusion detection systems, particularly those in the cost range of the average home or small business owner, suffer from very high false alarm rates, often 90% and above. This imposes prohibitive costs on local police departments having to answer these false alarms. Many cities have responded by charging fines for answering these calls. This in turn provides incentive to home and business owners to deactivate the alarm system to avoid the false alarms. One study suggests that in burglarized homes with alarm systems, almost half of the alarms weren't even activated.

Conventional intrusion detection systems suffer a high rate of false alarms for many reasons. One reason is that these systems provide minimal selectivity. As used herein, selectivity refers to an intrusion detection system's ability to distinguish movement on some basis, such as where the movement is occurring, how fast an object is moving, or the path that an object is moving along. Obviously, detection systems that are more selective will likely suffer fewer false alarms because threatening movement can be more precisely defined and distinguished from movement defined as benign. What is defined as threatening and benign will vary by the particular environment in which the system operates. For instance, in a home environment, threatening movement could be defined as movement around the outside perimeter of the house, while movement inside the house is defined as benign. Therefore, an intruder approaching a door or window from the outside would trigger the alarm, whereas a child opening a bedroom door would not.

A need therefore exists for a highly selective intrusion detection system and method.

SUMMARY OF THE INVENTION

Briefly stated, the present invention is directed to a system and method for highly selective intrusion detection using a sparse array of time modulated ultra wideband (TM-UWB) radars. TM-UWB radars emit very short RF pulses of low duty cycle approaching Gaussian monocycle pulses with a tightly controlled pulse-to-pulse interval. Two or more of these TM-UWB radars are arranged in a sparse array (i.e., they are spaced at intervals of greater than one quarter wavelength), preferably around the perimeter of a building. Each TM-UWB radar transmits ultra wideband pulses that illuminate the building and the surrounding area. One or more of the radars receives signal returns, and the signal return data is processed to determine, among other things, whether an alarm condition has been triggered.

An advantage of the current invention is that ultra wideband (UWB) pulses are used. As used herein, UWB refers to very short RF pulses of low duty cycle ideally approaching a Gaussian Monocycle. Typically these pulses have a relative bandwidth (i.e., signal bandwidth/center frequency) which is greater than 25%. The ultra wideband nature of these pulses improves both angle and range resolution, which results in improved performance (e.g., greater selectivity, more sensitive motion detection). The term "wavelength", as used herein in conjunction with ultra wideband systems, refers to the wavelength corresponding to the center frequency of the ultra wideband pulse.

Another advantage of the current invention is that high resolution radar images are formed which give an accurate picture of the inside of the building and the surrounding area. The current invention uses this image to, among other things, detect motion in a highly selective manner and to track moving objects within the building and the surrounding area. High resolution radar images are possible because the TM-UWB radars positioned around the perimeter of the building form a sparse array capable of achieving high angular resolution. Angular resolution is a function of the width of the TM-UWB radar array, i.e., the wider the array, the greater the angular resolution. Conventional narrowband radars arranged in a sparse array suffer off-axis ambiguities, and are therefore not practical. However, the UWB pulses transmitted by the TM-UWB radars are sufficiently short in duration (with very few sidelobes) that the radars can be used in a sparse array configuration without off-axis ambiguities. Furthermore, range ambiguities are cured by time-encoding the sequence of transmitted TM-UWB pulses.

Another advantage of the current invention is that highly selective motion detection is possible. Using the high resolution radar images generated by the TM-UWB radar array, motion can be distinguished based on criteria appropriate to the environment in which the intrusion detection system operates. For example, home security systems according to the present invention can distinguish outside movement around doors and windows from movement inside the house. Alternatively, business security systems can distinguish movement in an unsecured portion of the building from movement in a secured portion. This selectivity can result in lower false alarm rates.

Another advantage of the current invention is that high angular resolution may be achieved at a low center frequency. Because the transmitted UWB pulses have a large relative bandwidth, and because the radar array is wide, a lower center frequency can be maintained and still achieve a high angular resolution. Operating at a lower center frequency relaxes the timing requirements of the system, which makes it easier to achieve synchronization between the radars, and results in less complex, less expensive implementations. A low center frequency also results in UWB pulses that are able to better penetrate lossy materials and withstand weather effects.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit in the corresponding reference number.

BRIEF DESCRIPTION OF THE FIGURES

The present invention will be described with reference to the accompanying drawings, wherein.

DETAILED DESCRIPTION OF THE PREFERRED EMBODIMENTS

Overview of the Invention

The present invention is directed to a system and method for highly selective intrusion detection using a sparse array of TM-UWB radars. TM-UWB (or impulse) radio and radar technology was first fully described in a series of patents, including U.S. Pat. No. 4,641,317 (issued Feb. 3, 1987), U.S. Pat. No. 4,743,906 (issued May 10, 1988), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of TM-UWB patents include U.S. Pat. No. 5,677,927 (issued Oct. 14, 1997), U.S. Pat. No. 5,687,169 (issued Nov. 11, 1997) and U.S. Pat. No. 5,832,035 (issued Nov. 3, 1998) to Fullerton et al. These patent documents are incorporated herein by reference.

Figure 1:
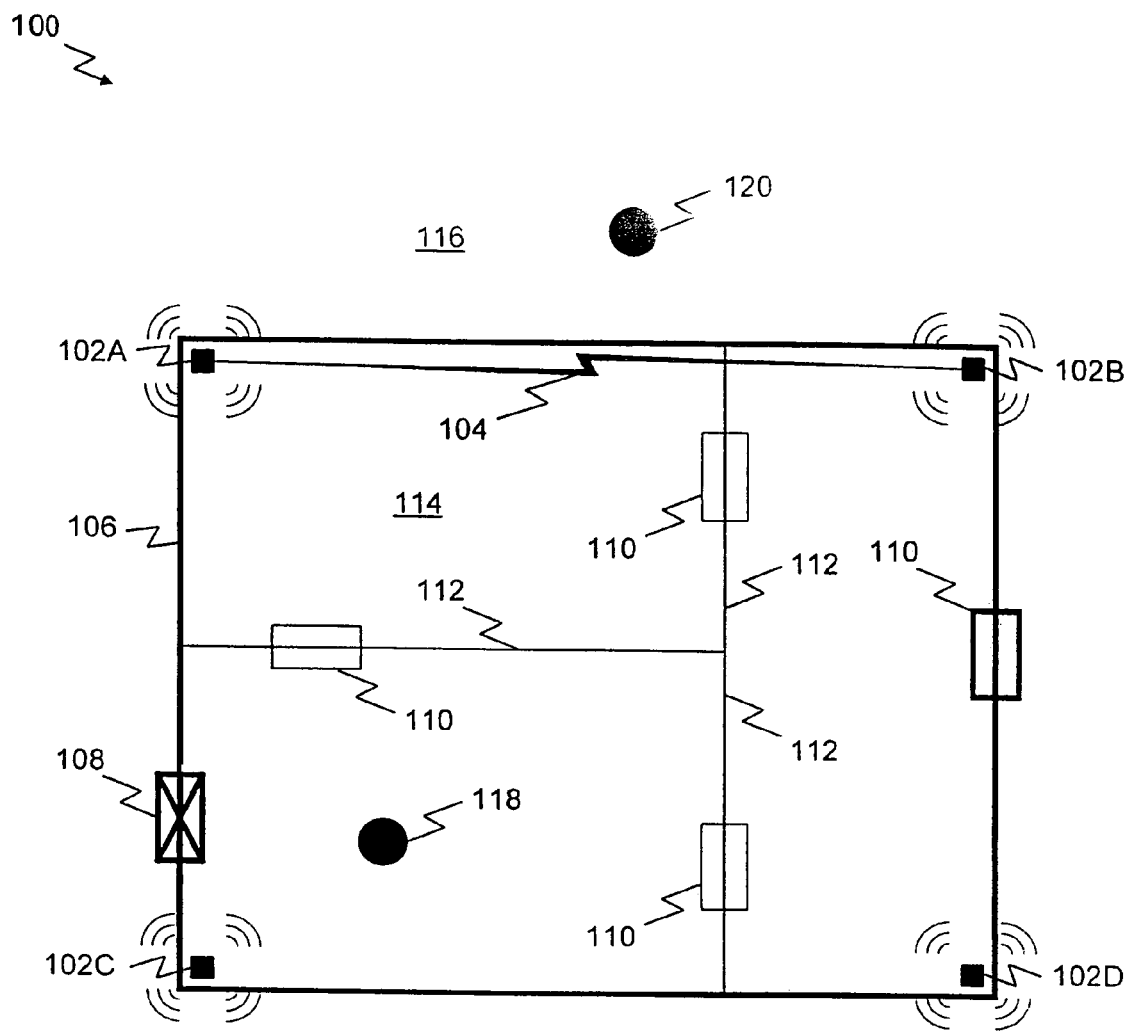
FIG. 1 illustrates an example building environment within which the present invention can be used.

FIG. 1 illustrates a building environment 100 within which the present invention is used. The present invention includes two or more sensors 102. In a preferred embodiment, four sensors 102 (102A, 102B, 102C, and 102D, as shown in FIG. 1) are located around the perimeter of a building. Using more than four sensors 102 will further reduce the false alarm rate. The sensors 102 communicate with each other via a communication pathway 104. Though only a single communication pathway 104 is shown, each sensor 102 can communicate with one or more of the other sensors 102.

The example building depicted in FIG. 1 includes perimeter (outside) walls 106, inside walls 112, doors 110, and windows 108. The areas in and around the building are conveniently divided into inside 114 and outside 116. Those skilled in the art will recognize that the building shown in FIG. 1 is only a simple example, and that the concepts described herein apply equally well to any arbitrarily shaped building, with any configuration of doors, windows, interior walls, and furnishings.

One of the primary objects of the present invention is to detect movement of objects in and around a perimeter, such as outside walls of a building. A perimeter may alternatively be defined as two boundaries to allow for noise and clutter variations. In a two boundary system, the perimeter may be defined as an inside and outside boundary separated by some distance (e.g. 2 ft). An object on the outside would have to cross the inside boundary to trigger an entry alarm; whereas, an object on the inside would have to cross the outside boundary to trigger an exit alarm.

The present invention will be described in an example embodiment where movement of object are detected in and around the building shown in FIG. 1. For convenience, both an inside target 118 and an outside target 120 are shown. The following discussion will refer to both collectively as targets.

Figure 2:
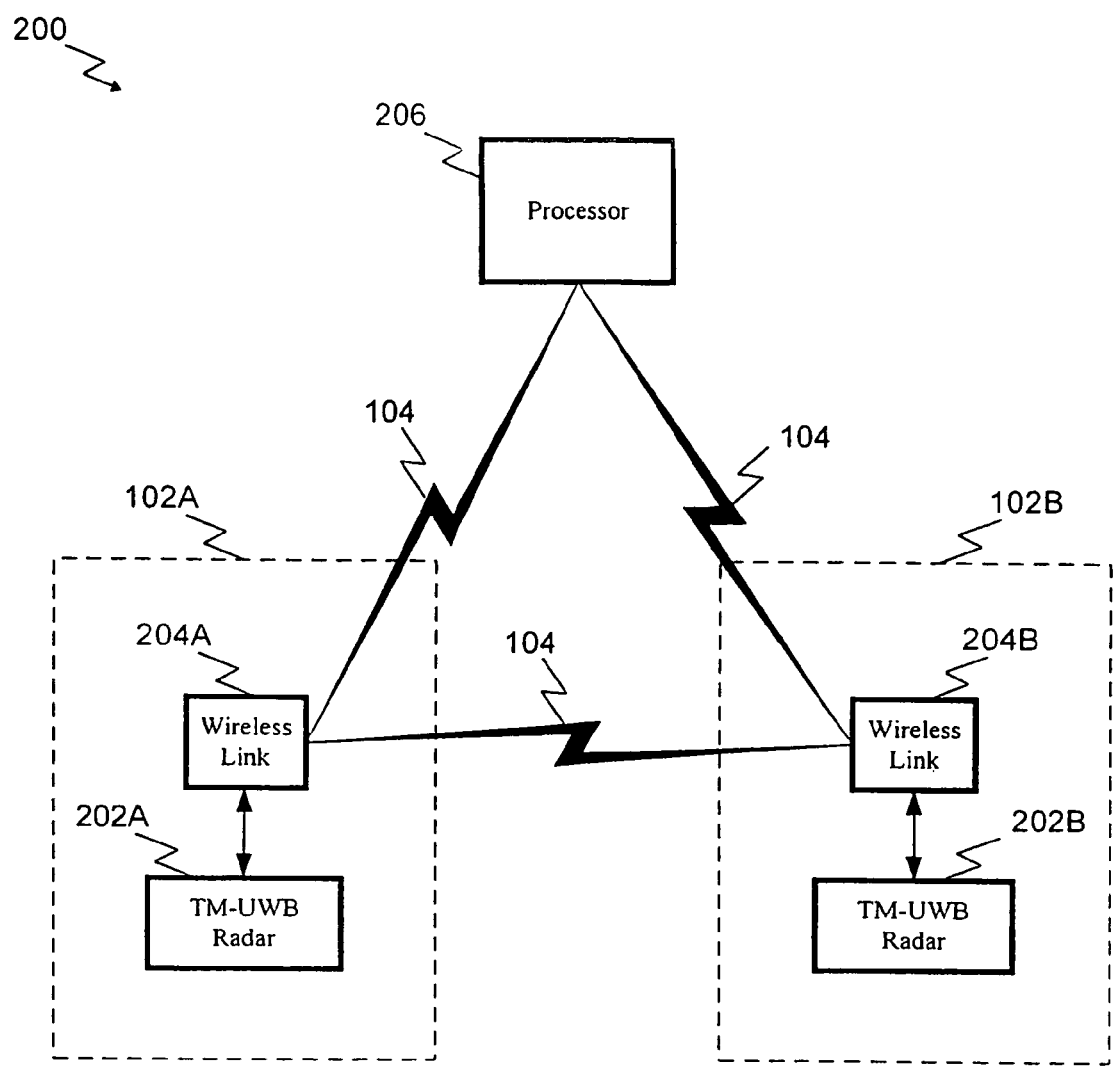
FIG. 2 depicts an intrusion detection system.

FIG. 2 depicts the components of the present invention in greater detail, referred to collectively as an intrusion detection system 200. Each sensor 102 preferably includes a TM-UWB radar 202, and a wireless link 204. The sensors 102 communicate with a processor 206 that is responsible for processing the data received by the sensors and determining whether an alarm condition has been met. Note that, for purposes of clarity, only two sensors 102 (A and B) are depicted in FIG. 2. As stated above, intrusion detection system 200 includes two or more sensors 102.

TM-UWB radar 202 is preferably implemented as described in U.S. Pat. Nos. 4,743,906, and 5,363,108, incorporated by reference above. However, those skilled in the art will recognize that the concepts described herein apply equally well to other radars that transmit time modulated UWB pulses.

TM-UWB radars 202 transmit UWB pulses and at least one receives signal returns, depending on the particular mode of operation (described below). Each TM-UWB radar 202 can utilize a single antenna element 208 for both transmission and reception, separate antenna elements for transmission and reception, or even an array of antenna elements for transmission and reception, including phased arrays of antennas. Those skilled in the art will recognize that the number and type of antenna elements will vary based on the particular application and desired transmission characteristics.

TM-UWB radar 202 preferably operates with a center frequency between 1 GHz and 3 GHz, and a pulse repetition rate of 1.25 MHZ. Other center frequencies are possible, though hydrometer effects introduce problems around 10 GHz and above. Similarly, the pulse repetition rate will vary based on the particular embodiment. Note that if the time modulation of the UWB pulses includes a random component, pseudo-random noise (rather than true noise) is used so that the noise sequence can be reproduced at the other radars. A good discussion of time modulation using pseudo-random noise codes for impulse systems is found in U.S. Pat. No. 5,677,927 (hereafter the '927 patent), incorporated by reference above.

Sensors 102 placed along the perimeter of a building will clearly be separated by more than a quarter wavelength at these center frequencies. The sensors therefore form a sparse array. Sparse arrays of TM-UWB radars are discussed in detail in commonly owned, co-pending U.S. patent application Ser. No. 09/332,503 (issued as U.S. Pat. No. 6,218,979), entitled "Wide Area Time Domain Radar Array," which has been incorporated by reference. Sensors 102 are preferably packaged for convenient installation in a conventional wall electrical socket, securely fastened such that it cannot easily be removed. Those skilled in the art will recognize that three-dimensional images may be obtained by ensuring that all the sensors 102 do not occupy the same horizontal plane, i.e., at least one sensor 102 occupies a horizontal plane different from the other sensors 102.

Processor 206 can be implemented using many different configurations of computer hardware and software, as is well known to those skilled in the art. Each particular application will dictate the processing needs of the system, size requirements, memory requirements, and other implementational details. Processor 206 can be physically located at any convenient location. Processor 206 can be included in the same packaging with a sensor 102, or close enough to a sensor such that data may be transferred between processor 206 and the nearby sensor via a cable. Alternatively, processor 206 can be physically distant from all sensor 102 and communicate with one or more of them wirelessly.

Communication pathway 104 represents a wire or wireless transmission medium. In a preferred embodiment, sensors 102 communicate with each other via a wireless link, wherein communication pathway 104 represents electromagnetic waves propagating through the environment. Alternatively, communication pathway 104 can be implemented as a cable (e.g., coaxial cable, optical fibre) connecting the radars.

Wireless links 204 provide for wireless communication between sensors 102 via communication pathway 104. Wireless links can be implemented as any number of conventional devices known to those skilled in the art, depending upon the bandwidth required by the particular application. However, wireless link 204 is preferably implemented as a TM-UWB radio, as described in many of the above cited patents and applications. In this preferred embodiment, data transfers are accomplished using subcarrier modulation as described in the '927 patent, incorporated by reference above. Alternatively, a single TM-UWB radar can be configured to perform the functions of wireless link 204 and TM-UWB radar 202. In other words, a single TM-UWB radar is used at each sensor 102 to transmit UWB radar pulses and communicate wirelessly with other sensors 102. Combining these functiontions into a single unit results in less expensive implementations. Further, in modes that include forward scattering, synchronization between the radars is achieved without requiring a separate synchronization signal. Note that wireless links 204 are unnecessary for those embodiments employing a cable as communication pathway 104.

Wireless links 204 are responsible for, inter alia, transmitting scattering data received by their associated radars 202, and exchanging synchronization information when forward scattering data is being taken. The bandwidth requirements for wireless links 204 depend upon the types of data analysis performed by processor 206, the rate at which TM-UWB radar 202 transmits UWB pulses, and various other factors. Wireless links 204 can also be either bidirectional or simplex, depending upon the requirements of the application. Those skilled in the art will recognize the cost to benefit tradeoff associated with conventional wireless implementations. Other implementations are discussed below.

Operation of the Current Invention

Figure 3:
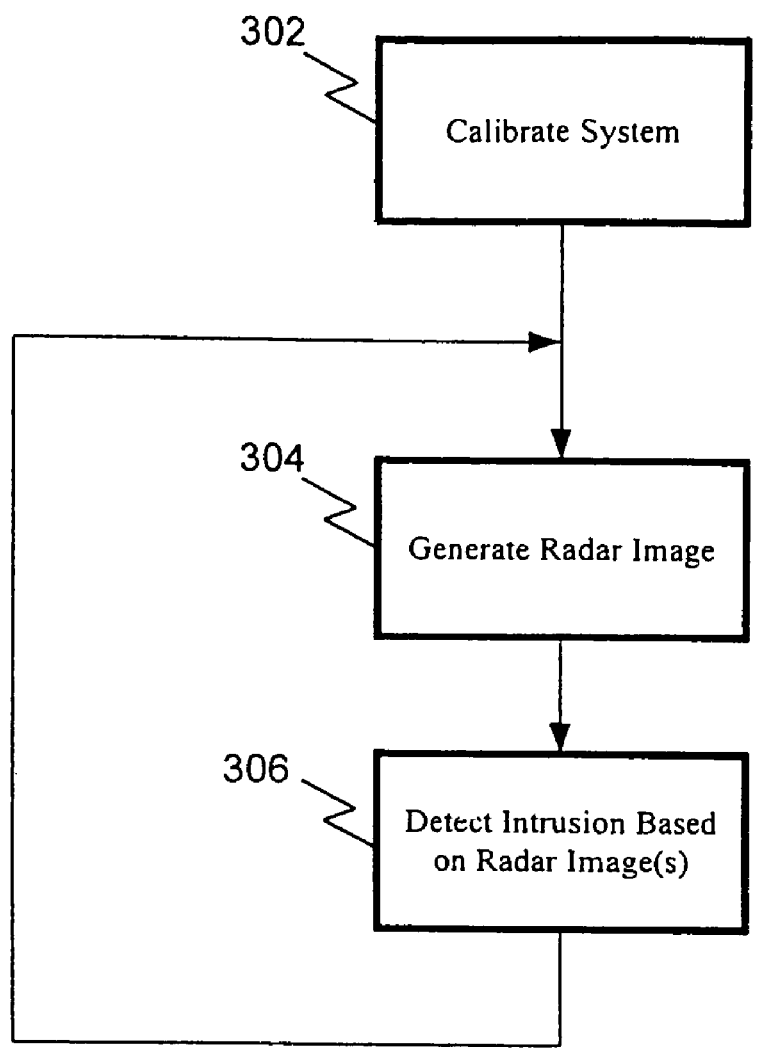
FIG. 3 is a flowchart that describes the operation of the intrusion detection system.

FIG. 3 is a flowchart that describes the operation of the current invention. This section provides an overview of the operation. Each step is then described in detail in the following sections.

In step 302, intrusion detection system 200 is calibrated. Calibration as used herein refers to, among other things, identifying the positions of the various sensors 102 and one or more security zones. A security zone, as described below, is an area in which certain movement could trigger an alarm condition. The calibration of step 302 is performed before intrusion detection system 200 begins monitoring building environment 100. Further details regarding calibration are provided after detailed discussions of the next two steps.

In step 304, a radar image is generated by the operation of intrusion detection system 200. The sensors 102 transmit UWB pulses, preferably in a omnidirectional manner, and then receive the reflected energy, referred to herein as signal returns or signal return data. Processor 206 then creates a radar image based on the signal return data collected by all sensors 102.

In step 306, processor 206 determines whether an alarm condition has been met. This determination is based on the current radar image, and in many cases, on past radar images as well. Intrusion detection system 200 triggers various alarms in the event that an alarm condition is met, such as lights, sirens, and calls to emergency personnel.

The following sections described each step in detail.

Generation of Radar Images

Figure 4:
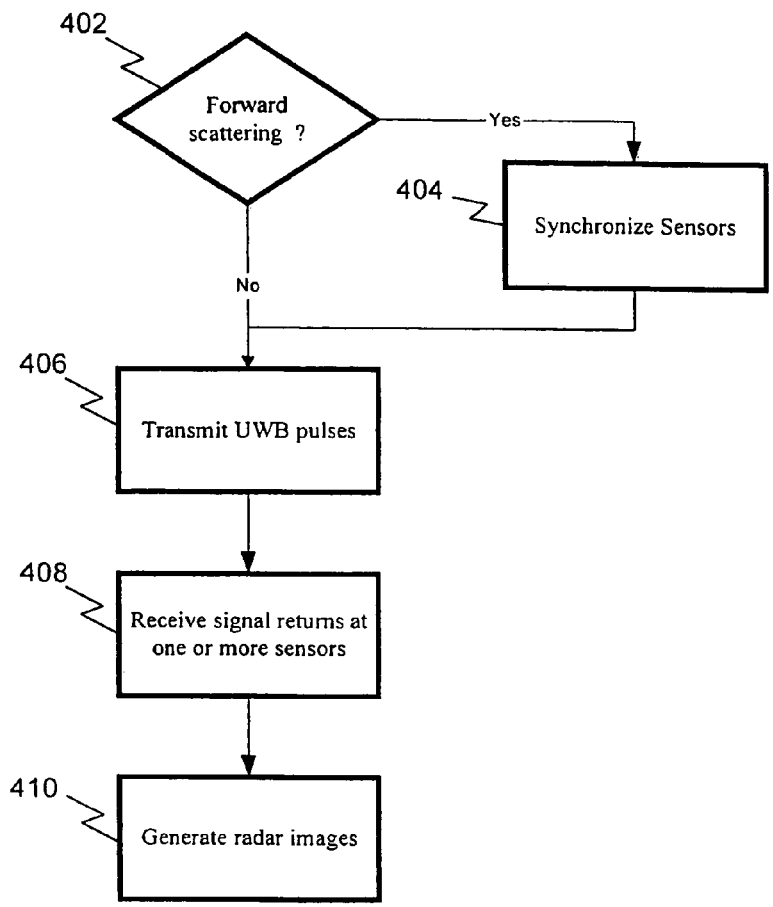
FIG. 4 is a flowchart that describes the generation of radar images.

FIG. 4 is a flowchart that describes step 304 in greater detail. In step 402, flow proceeds to step 404 only for those embodiments that include forward scattering measurements. In step 404, radars 202 are synchronized, as described in detail below. Skilled artisans will recognize that this synchronization allows for useful analysis of the scattering data.

In step 406, each of the radars 202 transmits UWB pulses, preferably in an omnidirectional fashion, radiating the pulsed energy in all directions.

In step 408, signal returns are received by at least one radar 202, depending upon the mode of operation. Intrusion detection system 200 preferably operates in three different modes of operation. In all three modes, each TM-UWB radar 202 transmits UWB pulses. The different modes vary based on which radars 202 are configured to receive signal returns, and whether the radars are synchronized for forward scattering measurements.

Figure 5:
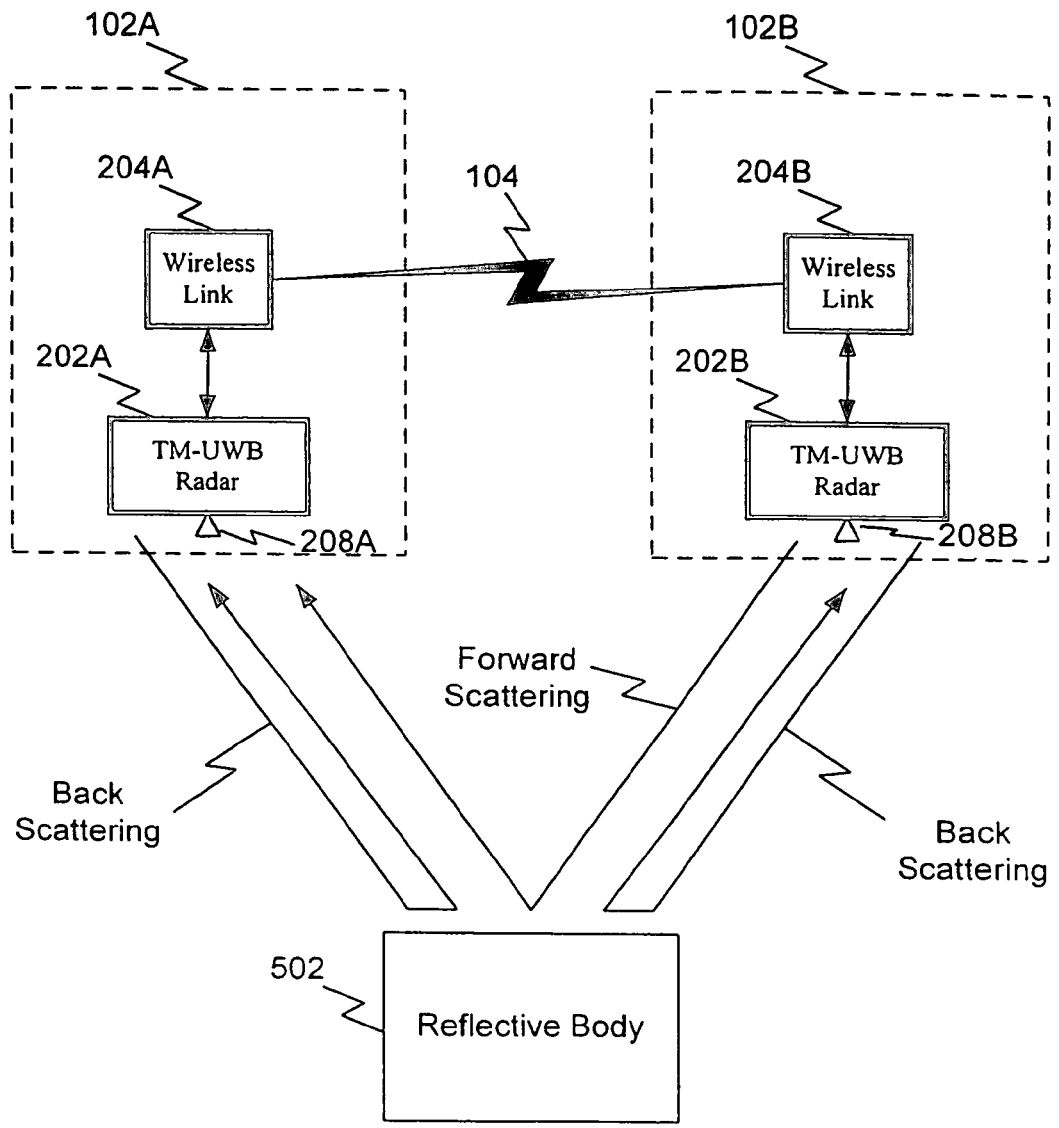
FIG. 5 depicts the intrusion detection system operating in a first mode including back scattering at each sensor and forward scattering.

FIG. 5 depicts intrusion detection system 200 operating in a first mode. Again, for purposes of clarity, only two sensors are depicted (102A and 102B) and a reflective body 502. Reflective body 502 represents any object, either inside 114 or outside 116, that reflects a portion of the transmitted pulse energy. As shown, both TM-UWB radars 202 transmit UWB pulses and receive the corresponding signal returns reflecting off reflective body 502. This process is known to those skilled in the art as back scattering, or mono-static operation. The back scattering data from each radar 202 is passed to processor 206 (not shown in FIG. 3) for analysis. As mentioned above, processor 206 can be located in close physical proximity or connected wirelessly to any one or more of sensors 102.

Sensors 102 also perform forward scattering (or bi-static) measurements, which refers to a TM-UWB radar 202 receiving signal returns corresponding to UWB pulses transmitted by another sensor 102. As shown in FIG. 5, radar 202A receives signal returns corresponding to UWB pulses transmitted by radar 202B. Radar 202B passes both back and forward scattering data on to processor 206. TM-UWB radars 202 must be synchronized in order to utilize the forward scattering data. This synchronization is preferably implemented across communication pathway 104.

Synchronizing radars 202 can be accomplished in at least two different ways. In a first embodiment, a synchronization signal is transmitted between radars 202 via wireless links 204. In this embodiment, wireless links 204 are chosen which have high temporal resolution, on the order of ten picoseconds. This resolution is necessary to achieve the desired synchronization.

In a second embodiment, each radar 202 receives UWB pulses transmitted by the radar 202B via two paths. As described above, radar 202A receives forward scattering signal returns that reflect off reflective body 502. However, radar 202A can also receive UWB pulses that travel directly from radar 202B to radar 202A. These UWB pulses can be used by radar 202A for synchronization, so long as the distance between the radars is known. Those skilled in the art will recognize that the antenna 208B associated with radar 202B must be chosen such that its beam pattern provides for sufficient transmission in the direction of radar 202A.

Figure 6:
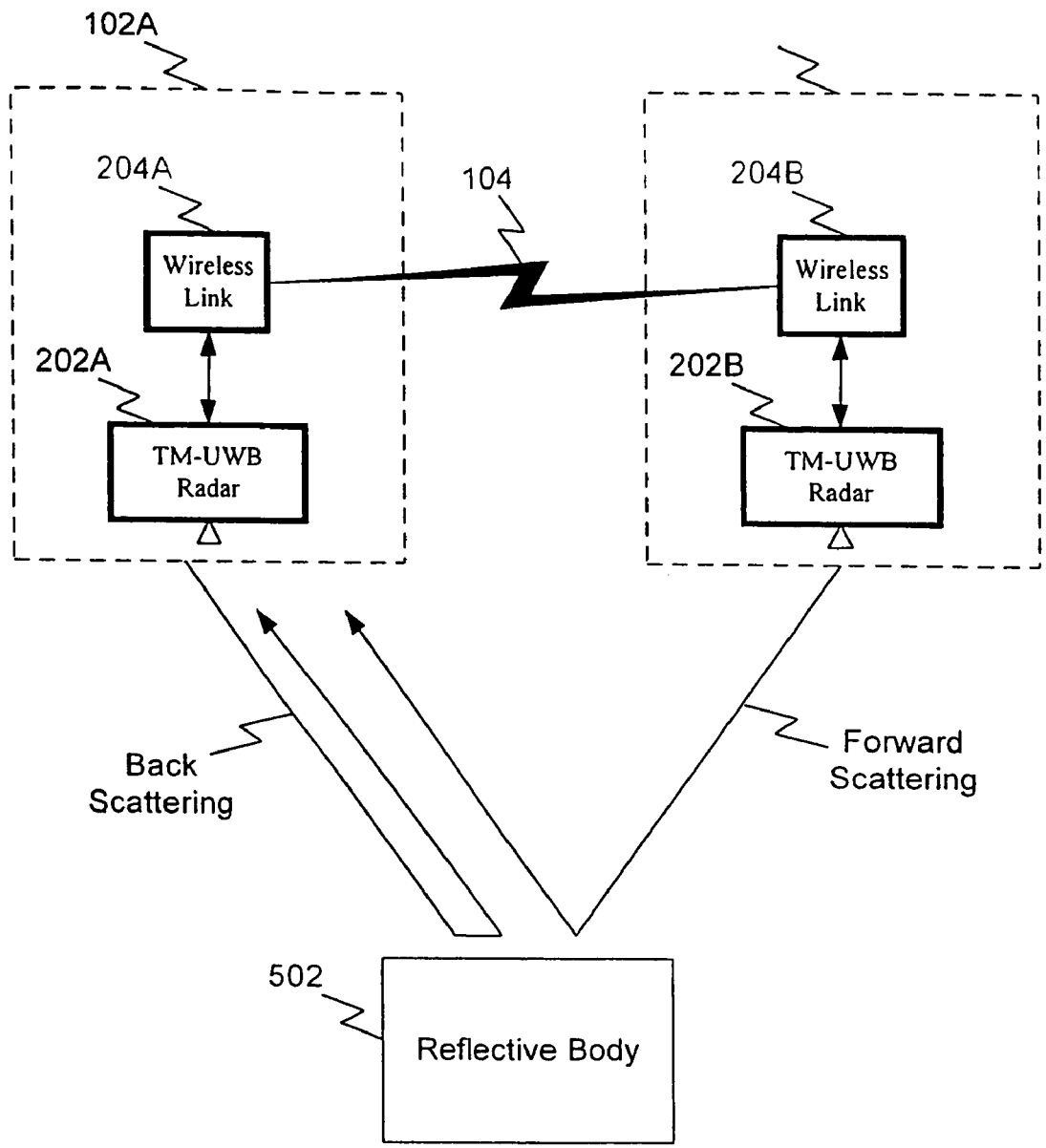
FIG. 6 depicts the intrusion detection system operating in a second mode including back scattering at one sensor and forward scattering.

FIG. 6 depicts intrusion detection system 200 operating in a second mode. In this mode, certain of the radars 202 are used for forward scattering purposes only, i.e., they transmit UWB pulses which are received by other radars 202, but do not themselves receive any signal returns. For example, in FIG. 6, radar 202B transmits UWB pulses that are received by radar 202A, as indicated by the forward scattering propagation path. Radar 202A receives the forward scattering signal returns corresponding to UWB pulses transmitted by radar 202B, and also receives its own back scattering signal returns. If intrusion detection system 200 operates only in the second mode, radar 202B can be implemented in a more simple, inexpensive manner because it need only transmit, not receive.

Again, the radars must be synchronized, preferably across communication pathway 104, in order to utilize the forward scattering data. Note that in this mode, only the radar that receives signal returns passes data (both back and forward scattering data) to processor 206 (not shown in FIG. 6) for analysis. Furthermore, communication only needs to proceed in one direction between wireless links 204, i.e., from radar 202A to radar 202B. Therefore, for embodiments only operating in the second mode, wireless link 204B can be implemented as a receiver only.

Figure 7:
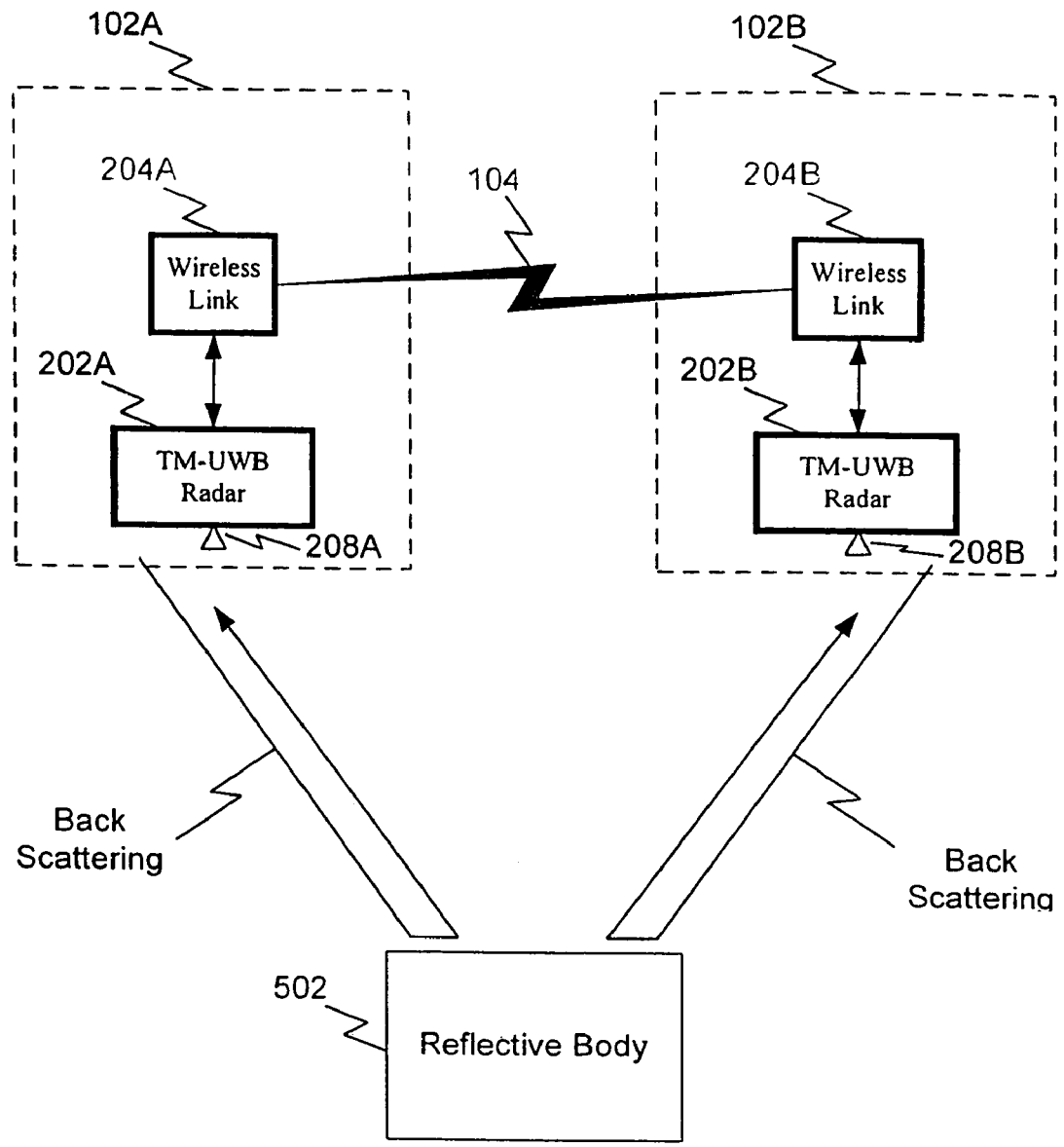
FIG. 7 depicts the intrusion detection system operating in a third mode including back scattering only.

FIG. 7 depicts intrusion detection system 200 operating in the third mode. In this mode, all of the radars 202 collect back scattering data only. As shown in FIG. 7, each radar 202 transmits UWB pulses and receives the corresponding signal returns. The back scattering data collected by each radar 202 is passed on to processor 206 (not shown in FIG. 7) for analysis. Note that in this mode, there is no requirement that the radars 202 be synchronized because forward scattering data is not being collected.

Figure 8:
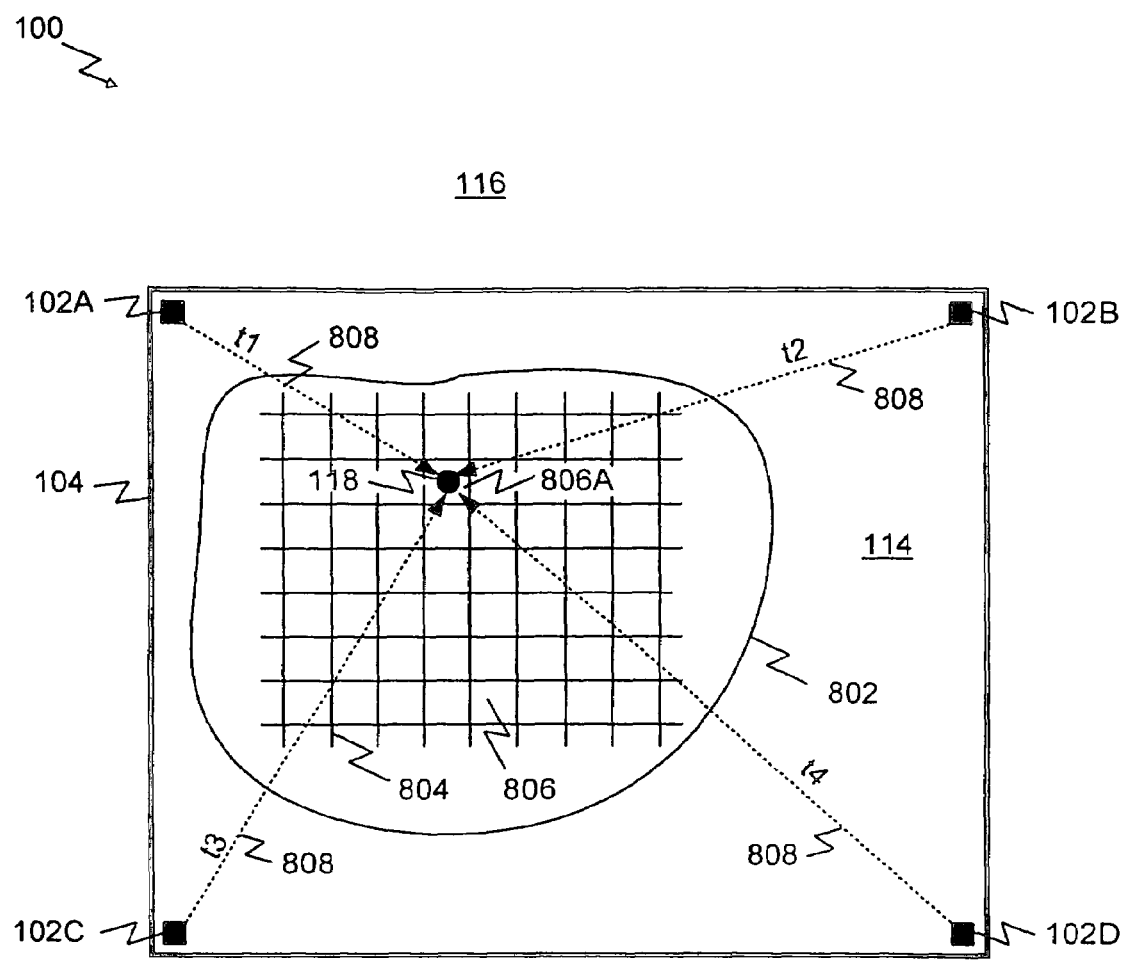
FIG. 8 depicts an imaging area within an example building environment.

Returning to the flowchart of FIG. 4, in step 410, processor 206 generates a radar image based on the signal return data collected by sensors 102. FIG. 8 depicts building environment 100 for purposes of illustrating the analysis of back scattering data (and forward scattering, where available) to generate an image of inside target 118. FIG. 8 also depicts an imaging area 802 that defines an example area to be imaged. Imaging area 802 could, for example, represent a portion of the building inside 114, the entire inside 114, or the inside 114 and outside 116. The needs of each particular intrusion system will determine which areas require surveillance, i.e., radar imaging.

A grid 804 criss-crosses imaging area 802, defining one or more voxels 806 (a voxel is a minimum resolution portion of a three dimensional space, comparable to a pixel in two dimensional space). As described below, processor 206 calculates a value for each voxel 806 indicative of the reflected energy measured in the portion of imaging area 802 defined by that voxel. The resulting grid 804 of voxels 806 forms a radar image of imaging area 802. Grid 804 is maintained in processor 206, and can vary in spacing to define voxels 806 having different resolution (grid 804 need not be orthogonal). Decreasing the grid spacing increases the resolution of the generated image. As shown in FIG. 8, inside target 118 occupies a single voxel 806A. Though this simplifies the discussion, skilled artisans will recognize that in practice a higher resolution will often be desired.

Figure 9:
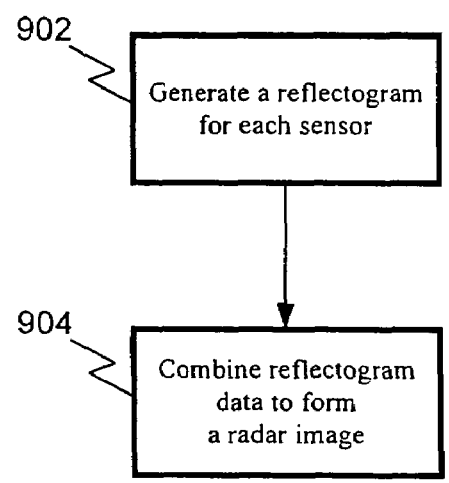
FIG. 9 is a flowchart that describes the generation of a radar image.
Figure 10:
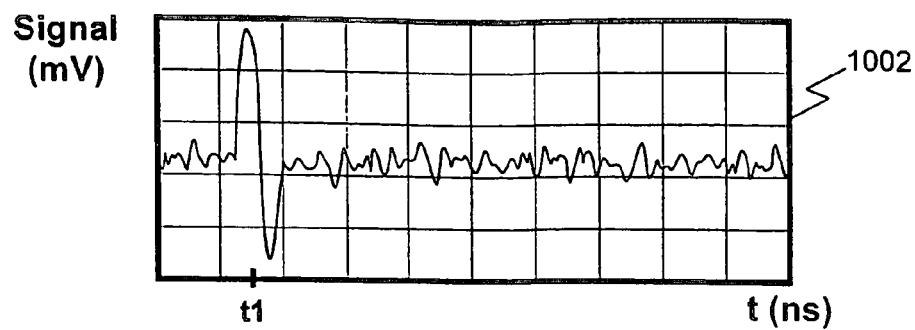
FIG. 10 depicts example reflectograms for four sensors.
Figure 10:
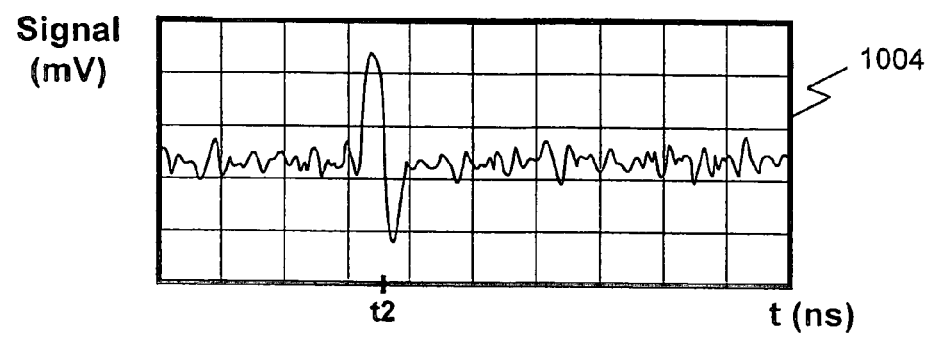
Figure 10:
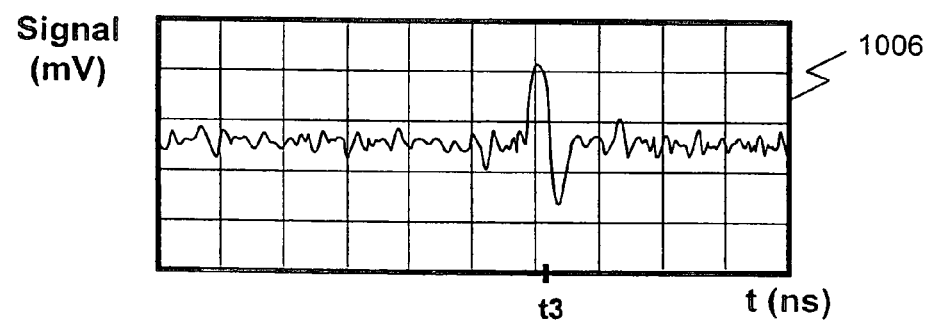
Figure 10:
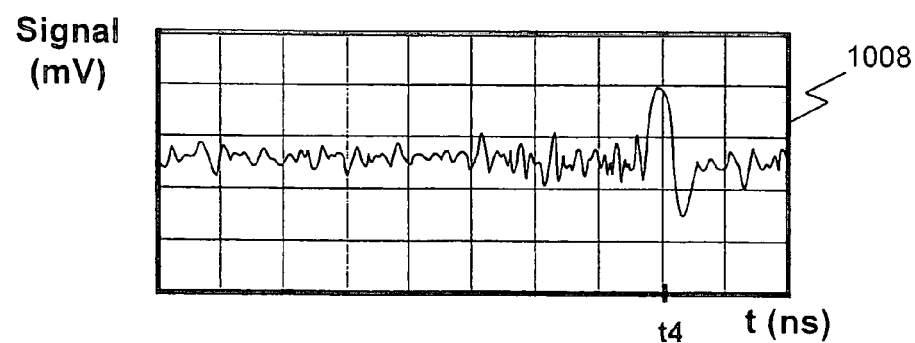

FIG. 9 is a flowchart that depicts step 410 in greater detail according to a preferred time domain interferometry technique for calculating a value for each voxel 806 in imaging area 802. In step 902, a reflectogram is generated for each radar 202 in intrusion detection system 100. FIG. 10 depicts four example reflectograms, 1002, 1004, 1006, and 1008, corresponding to sensors 102A, 102B, 102C, and 102D, respectively. Skilled artisans will recognize that a reflectogram describes reflected energy as a function of range (i.e., distance from the transmitting antenna). For example, reflectogram 1002 describes the reflected energy measured at sensor 102A, whereas reflectogram 1004 describes the reflected energy measured at sensor 102B. The x-axis represents range, while the y-axis represents reflected energy measured as voltage.

In a preferred embodiment, each radar 202 generates a reflectogram by sweeping through the ranges of interest, measuring reflected energy at discrete ranges. At each discrete range, radar 202 transmits ultra wideband pulses 808 and then looks for reflected energy after a time delay corresponding to the return time-of-flight. Further details regarding the operation of radar 202 are provided in U.S. Pat. Nos. 4,743,906, and 5,363,108, incorporated by reference above. Radar 202 receives and, where multiple pulses are transmitted for each discrete range step, accumulates reflected energy.

Those skilled in the art will recognize that more reflected energy will be measured per transmitted pulse for nearby targets, as compared to those targets positioned farther away. Compensating for this effect allows for more efficient use of the radar's dynamic range. In a preferred embodiment, radar 202 transmits and receives an increasing number of pulses per discrete range step as the range is increased. The reflected energy measured at longer ranges is therefore increased by receiving and integrating a greater number of pulses. The ranges of interest are preferably divided into multiple "range windows," where the same number of pulses is transmitted for each discrete range within a given window. Skilled artisans will recognize that this is only one example of how this compensation might be implemented.

Alternatively, the power of transmitted pulses can be varied according to range. In this embodiment, radar 202 increases the power of transmitted pulses as the range gets longer. This alternative compensation has a similar effect to varying the number of transmitted pulses, but will likely require more costly modifications to the basic radar 202 to implement. This, and other related concepts are described in commonly owned, U.S. patent application Ser. No. 09/332,501 (issued as U.S. Pat. No. 6,539,213), entitled "System and Method for Impulse Radio Power Control," which is incorporated herein by reference.

Returning again to FIG. 9, in step 904 an image is formed by selectively combining data from the reflectograms generated in step 902. An image value is calculated for each voxel 806, where the image value is indicative of the total amount of reflected energy measured over that portion of imaging area 802. Processor 206 preferably calculates an image value for each voxel 806 by summing voltage values from the reflectogram associated with each sensor 102, where the voltage values correspond to the return time-of-flight from the radar to the voxel being calculated. For example, referring to FIGS. 8 and 10, the image value for voxel 806A is the sum of a voltage value from reflectograms 1002, 1004, 1006, and 1008 corresponding to the return time-of-flight. As shown in reflectogram 1002, the voltage value at time t1 corresponds to the return time-of-flight from sensor 102A to voxel 806A, as shown in FIG. 8. Similarly, times t2, t3, and t4 correspond to the return time-of-flight from sensors 102B, 102C, and 102D to voxel 806A, as shown in reflectograms 1004, 1006, and 1008. The sum of these four values forms the image value for voxel 806A.

In this manner the image value for each voxel 806 in image area 802 is calculated as the sum of a voltage from each reflectogram corresponding to the return time-of-flight.

Intrusion Detection

Returning to FIG. 3, in step 306, processor 206 determines whether an alarm condition has been triggered indicating an intrusion. What is defined as an alarm condition depends upon the particular environment in which intrusion detection system is used. For example, in a home security environment, an alarm condition is triggered when a moving object approaches and penetrates a perimeter around the outside of the house or some other predetermined exterior boundary. Alternatively, in a building security environment, movement in a restricted area within the building triggers an alarm condition. Those skilled in the art will recognize that alarm conditions will vary, depending upon the exact environment in which intrusion detection system 200 is installed and the types of intrusion that are to be detected.

In a preferred embodiment, processor 206 uses the radar images generated in step 304 to detect motion and to track moving objects. In many instances, processor 206 need only detect movement in a given area. In the aforementioned building security environment, movement detected in a restricted area triggers an alarm condition. Other alarm conditions require additional processing to distinguish between different types of movement. For instance, movement in the vicinity of a window should trigger an alarm condition if the object approached the window from outside 116, but not if the object approached from inside 114. Processor 206 can distinguish between these two types of movement by tracking moving objects over time.

Figure 11:
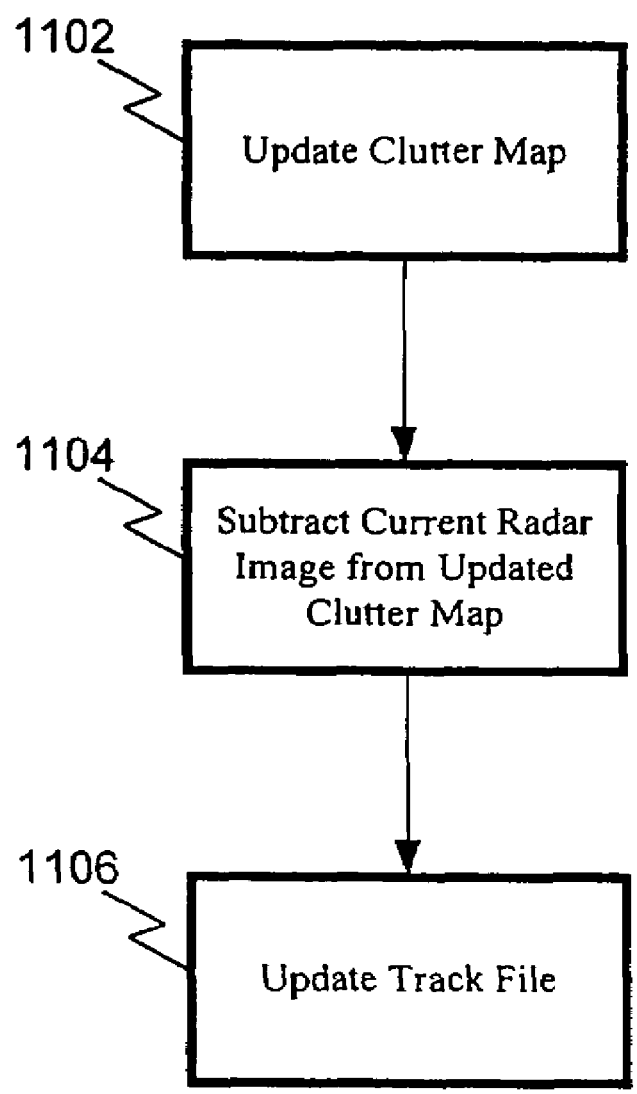
FIG. 11 is a flowchart that describes processing the radar images to determine whether an alarm condition has been triggered.

FIG. 11 is a flowchart that depicts step 306 in detail according to a preferred embodiment. In step 1102, processor 206 updates a clutter map. The clutter map represents stationary and other "don't care" objects within imaging area 802. For instance, a clutter map might include stationary objects such as furniture and walls within a building. The clutter map can also include moving objects that should not trigger an alarm condition, such as ceiling fans.

Those skilled in the art will recognize that the clutter map can be determined in different ways. In one embodiment, the first radar image generated by intrusion detection system 200 is defined as the clutter map. This approach is easy to implement, but is not very robust. For instance, if a piece of furniture within imaging area 802 is moved after the clutter map is generated, it will thereafter appear as a moving object because it was not part of the clutter map. In this embodiment, processor 206 sets the clutter map equal to the first radar image generated in step 304, and does not change the clutter map based on subsequent radar images.

In a preferred embodiment, however, the clutter map is updated based on subsequent radar images by low-pass filtering the current radar image on a voxel by voxel basis, and adding the filtered image to the stored clutter map. In this way, the clutter map is slowly updated over time so that stationary objects not present initially will be incorporated into the clutter map. For example, if sensors 102 transmit UWB pulses with a center frequency of 2 GHz, and if the 3 dB knee of the lowpass filter is 0.1 Hz, then anything moving at a rate faster than ¾ inches in 10 seconds will not be passed through the lowpass filter to the clutter map.

Figure 12A:
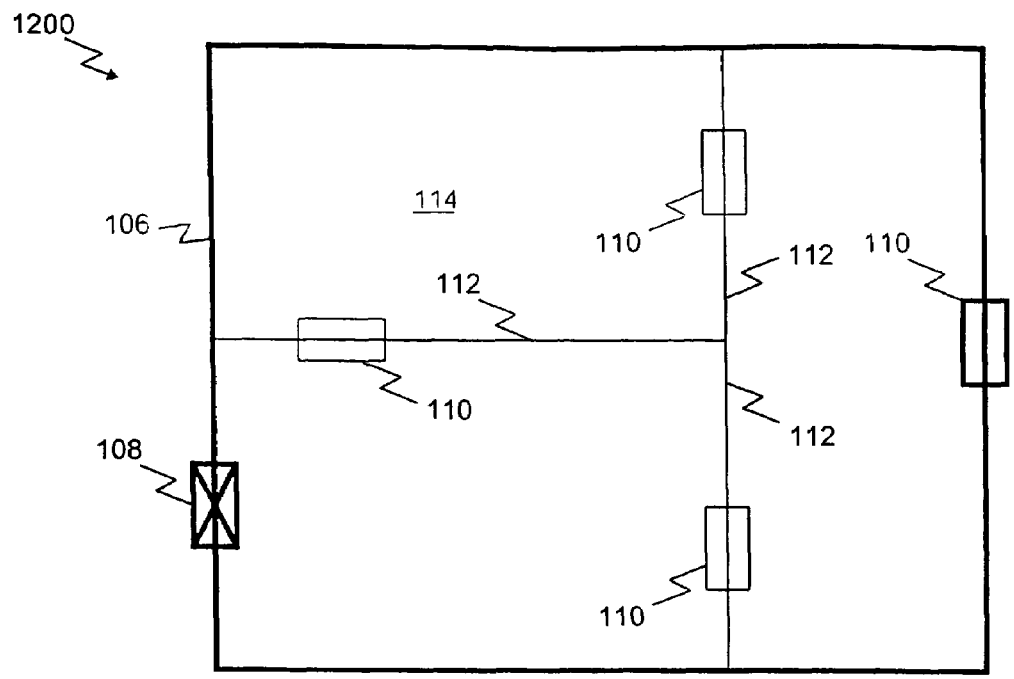
FIG. 12A depicts an example clutter map.
Figure 12B:
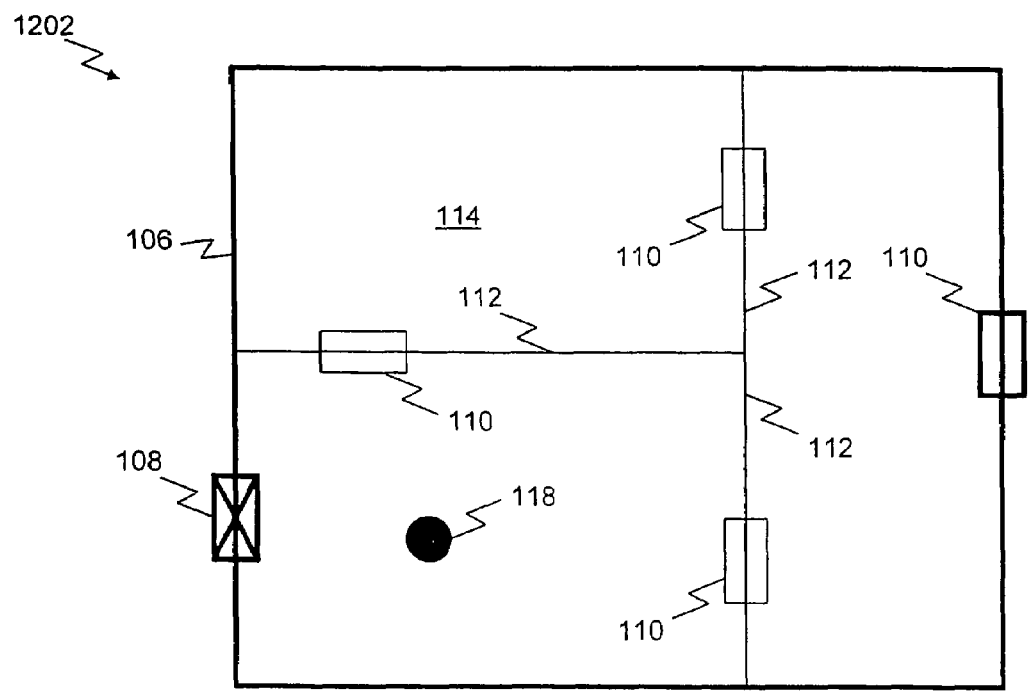
FIG. 12B depicts an example radar image with a moving target.
Figure 12C:
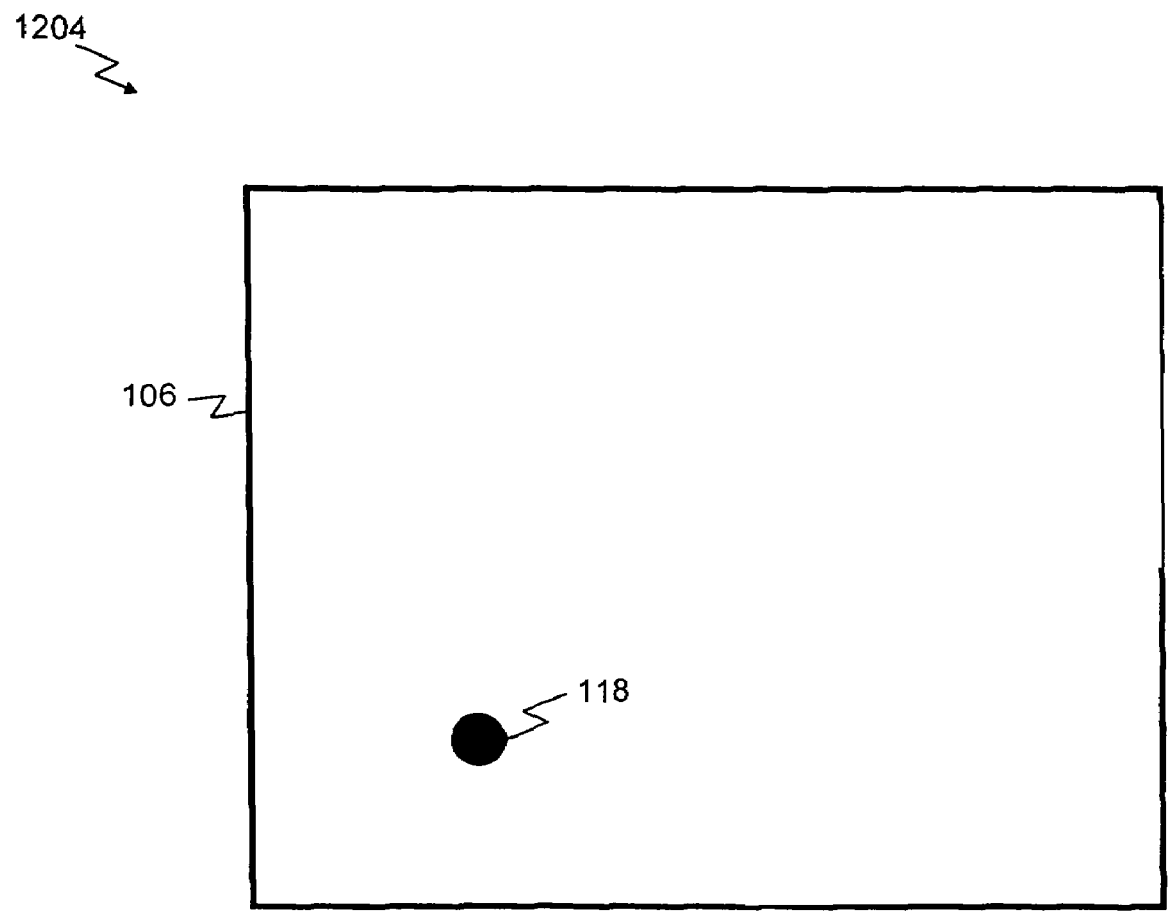
FIG. 12C depicts an example differential map, calculated as the difference between the clutter map of FIG. 12A and the radar image of FIG. 12B.

In step 1104, processor 206 subtracts the updated clutter map from the current radar image. The resulting image represents objects within imaging area 802 that were not present in past radar images. FIG. 12A depicts an example clutter map 1200 of building environment 100, including stationary objects such as doors 110, windows 108, interior walls 112 and exterior walls 106 (assume that everything shown in FIG. 12A is within imaging area 802). FIG. 12B depicts a radar image 1202 generated subsequent to clutter map 1200. As shown, inside target 118 has entered the building. FIG. 12C depicts a differential map 1204 calculated in step 1104 by subtracting clutter map 1200 from radar image 1202. Differential map 1204 therefore represents objects that have moved within imaging area 802. The appearance of inside target 118 will trigger an alarm condition for those intrusion detection systems that are configured to detect movement in that particular area.

In step 1106, a track file is updated based on differential map 1104 calculated in step 1104. The track file contains information on moving objects being tracked within imaging area 802. For example, a track file is a collection of historical information on identified objects to allow determination of object motion parameters, such as position, speed, velocity, and direction. In a preferred embodiment, objects that appear in differential map 1204 are compared against those objects currently being tracked in the track file. Each object in differential map 1204 is either associated with and used to update an existing object in the track file, or is added to the track file as a new object to track.

One method of generating a track file is to map an area using reflectogram data from several sensors, and then later, map the area again and subtract the first map data to derive a map of changes relating to motion in the area. The largest peaks are then identified as objects to be tracked and all energy within a radius (e.g., 1 foot) of each peak is considered part of the object. The object centroid is then found by determining the centroid of all of the "change" signal within the radius. This set of centroids is then compared with previous centroids from the track file. The nearest previous object would be considered the same object of the purposes if determining object motion, velocity, direction. These parameters may be determined from the history of the object centroid locations.

A track file may alternatively be maintained by determining an area within some range (e.g., 1 foot) of a previous centroid location for an object, and then computing a new centroid based on this area to be associated with the object. In this way, an object may be incrementally tracked across a room and objects may be determined as entering or exiting a door or widow.

Map threshold levels may be used to limit the number of objects to a reasonable level. Objects may disappear, or be dropped from the track file, if the total energy drops below a disappearance threshold for a period of time. Likewise objects may be generated based on a single peak threshold crossing, but may not achieve full "object" status until it maintains threshold for a period of time.

Tracking the movement of objects within imaging area 802 allows for more sophisticated alarm conditions to be defined. For instance, in the home security environment described above, an alarm condition might be triggered where outside target 120 approaches window 108, whereas inside target 118 approaching window 108 does not. Those skilled in the art will recognize the many ways that tracking could be used to define robust alarm conditions in a variety of environments.

Calibration

Returning to FIG. 3, intrusion detection system 200 is calibrated in step 302 prior to generating a radar image in step 304 and detecting intrusion in step 306. The processing described above with respect to steps 304 and 306 depends, in part, on having accurate knowledge of where the sensors are located with respect to one another. Calibrating intrusion detection system 200 refers to determining these relative positions.

Figure 13:
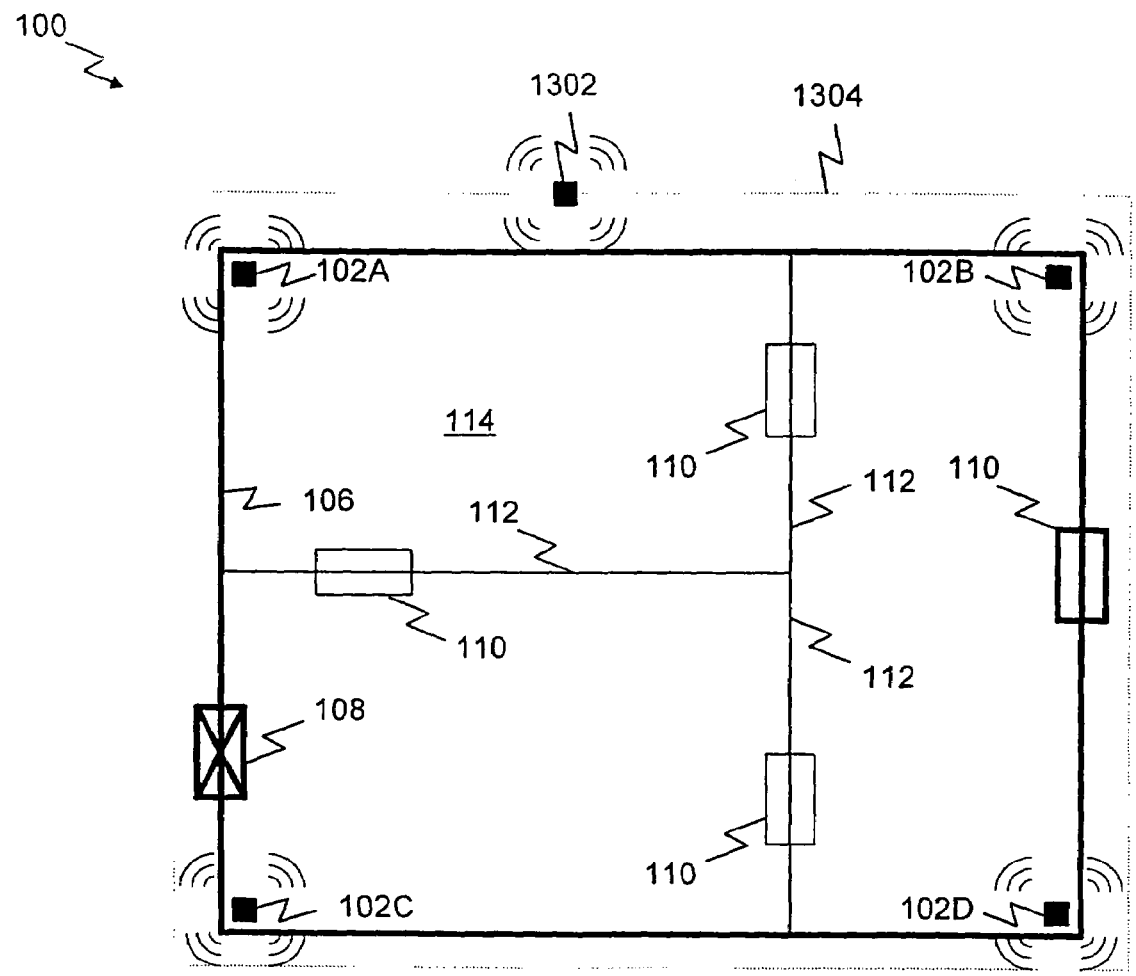
FIG. 13 depicts a preferred calibration of the home intrusion system.

FIG. 13 depicts a first alternative calibration system for intrusion detection system 200. A portable transmitter 1302 is moved along a calibration path 1304 around the area to be protected. For the example shown in FIG. 13, calibration path 1304 follows the outside walls 106 of the building. Those skilled in the art will recognize that calibration path 1304 will vary for different environments and alarm conditions. Portable transmitter 1302 transmits UWB pulses, such as a TM-UWB radar 202.

All of the sensors 102 lock their receivers to transmitter 1302 and track its movement around calibration path 1304. As the sensors 102 track transmitter 1302, datum marks are made periodically. This is preferably accomplished by the operator pressing a button that modulates transmitter 1302, sending a bit stream to each sensor 102 identifying the index number of the data point being sent. Alternatively, a real-time clock can be used to continually mark the data received by the sensors 102. In either case, after completion each sensor 102 sends the calibration data to processor 206 to determine the position of the sensors 102 in relation to each other and calibration path 1304.

In a second alternative embodiment, in step 302, the calibration is performed manually, by locating each sensor on a map, blueprint, survey, or by direct measurement. The calibration data is entered into processor 206 by conventional means familiar to those skilled in the art.

In a third alternative embodiment, in step 302, each sensor 102 locks on to UWB pulses transmitted by another sensor 102, one after another, until a range is determined between each pair of sensors 102. The sensors can be adapted to perform range finding as described in commonly owned, co-pending U.S. patent application Ser. No. 09/045,929, filed Mar. 23, 1998, entitled "System and Method For Position Determination By Impulse Radio," which is incorporated herein by reference. Another alternative embodiment for adapting the sensors to perform range finding is described in commonly owned, co-pending U.S. patent application Ser. No. 09/083,993, filed May 26, 1998, entitled "System and Method For Distance Measurement by Inphase and Quadrature Signals In A Radio System," which is also incorporated herein by reference. Each sensor 102 sends the calibration data to processor 206 to determine the position of the sensors 102 in relation to each other.

CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

The invention claimed is:

1. An ultra wideband (UWB) apparatus, comprising:
   an UWB radar that uses UWB radar signals to detect an object; and
   an impulse radio that modulates UWB signals to communicate information, wherein the impulse radio uses UWB signals to perform range finding relative to another impulse radio for determining the location of the object.

2. The UWB apparatus of claim 1, wherein said UWB radar transmits the UWB radar signals.

3. The UWB apparatus of claim 1, wherein said UWB radar receives signal returns of UWB radar signals reflecting off said object.

4. The UWB apparatus of claim 3, wherein said signal returns correspond to at least one of forward scattering signal returns and back scattering signal returns.

5. The UWB apparatus of claim 4, further comprising:
   a processor that processes said at least one of said back scattering returns and said forward scattering returns to determine the movement of said object.

6. The UWB apparatus of claim 5, wherein said processor triggers a condition when said object penetrates a boundary.

7. The UWB apparatus of claim 1, wherein said UWB radar and said impulse radio are combined into a single unit that performs integrated UWB radar, communications, and range finding functions.

8. The UWB apparatus of claim 1, wherein said location is used to determine the position of said object.

9. An UWB apparatus, comprising:
an UWB radar that transmits UWB radar signals and receives back scattering signal returns of said UWB radar signals reflecting off an object, and
an impulse radio that modulates UWB signals to communicate information, wherein the impulse radio uses UWB signals to perform range finding relative to another impulse radio for determining the location of the object.

10. The UWB apparatus of claim 9, further comprising:
a processor that processes said back scattering signal returns to determine the movement of said object.

11. The UWB apparatus of claims 10, wherein said processor triggers a condition when said object penetrates a boundary.

12. The UWB apparatus of claim 9, wherein said UWB radar receives forward scattering signal returns of UWB radar signals that are transmitted by another UWB radar.

13. The UWB apparatus of claim 12, further comprising:
a processor that processes at least one of said back scattering signal returns and said forward scattering signal returns to determine the movement of said object.

14. The UWB apparatus of claims 13, wherein said processor triggers a condition when said object penetrates a boundary.

15. The UWB apparatus of claim 9, wherein said UWB radar and said impulse radio are combined into a single unit that performs integrated UWB radar, communications, and range finding functions.

16. The UWB apparatus of claim 9, wherein said location is used to determine the position of said object.

17. An UWB apparatus, comprising:
a UWB radar that receives forward scattering signal returns of UWB radar signals reflecting off an object; and
an impulse radio that modulates UWB signals to communicate information, wherein the impulse radio uses UWB signals to perform range finding relative to another impulse radio for determining the location of the object.

18. The UWB apparatus of claim 17, further comprising:
a processor that processes said forward scattering signal returns to determine the movement of said object.

19. The UWB apparatus of claims 18, wherein said processor triggers a condition when said object penetrates a boundary.

20. The UWB apparatus of claim 17, wherein said UWB radar also receives back scattering signal returns reflecting off of the object.

21. The UWB apparatus of claim 20, further comprising:
a processor that processes at least one of said back scattering signal returns and said forward scattering signal returns to determine the movement of said object.

22. The UWB apparatus of claims 21, wherein said processor triggers a condition when said object penetrates a boundary.

23. The UWB apparatus of claim 17, wherein said UWB radar and said impulse radio are combined into a single unit that performs integrated UWB radar, communications, and range finding functions.

24. The UWB apparatus of claim 17, wherein said location is used to determine the position of said object.

25. An UWB apparatus, comprising:
a first UWB radar that transmits first UWB radar signals,
a second UWB radar that receives forward scattering signal returns of said first UWB radar signals reflecting off an object; and
a first impulse radio and a second impulse radio that communicates with said first impulse radio using UWB signals, wherein said first impulse radio performs range finding to determine a range relative to said second impulse radio used for determining the location of the object.

26. The UWB apparatus of claim 25, further comprising:
a processor that processes said forward scattering signal returns to determine the movement of said object.

27. The UWB apparatus of claim 26 wherein said processor triggers a condition when said object penetrates a boundary.

28. The UWB apparatus of claim 25, wherein said second UWB radar transmits second UWB radar signals and receives back scattering signal returns of said second UWB radar signals reflecting off the object.

29. The UWB apparatus of claim 27, further comprising:
a processor that processes at least one of said back scattering signal returns and said forward scattering signal returns to determine the movement of the object.

30. The UWB apparatus of claims 29, wherein said processor triggers a condition when said object penetrates a boundary.

31. The UWB apparatus of claim 25, wherein one of said first UWB radar and said second UWB radar is combined into a single unit with one of said first impulse radio and said second impulse radio to perform integrated UWB radar, communications, and range finding functions.

32. The UWB apparatus of claim 25, wherein said location is used to determine the position of said object.

33. A method of UWB signaling, comprising:
transmitting UWB radar signals;
receiving signal returns of said UWB radar signals reflecting off an object;
communicating information from a first impulse radio to a second impulse radio using UWB signals; and
performing range finding to determine a range between said first impulse radio and said second impulse radio used for determining the location of the object,
wherein said at least one of said transmitting and said receiving are performed by said first impulse radio.

34. The method of claim 33, wherein said signal returns correspond to at least one of back scattering signal returns and forward scattering signal returns.

35. The method of claim 33, further comprising:
processing at least one of said back scattering returns and said forward scattering returns to determine the movement of said object.

36. The method of claims 33, further comprising:
triggering a condition when said object penetrates a boundary.

37. The method of claim 33, wherein said location is used to determine the position of said object.

38. A method of UWB signaling, comprising:
receiving at an impulse radio at least one of back scattering signal returns and forward scattering signal returns of transmitted UWB radar signals that reflect off an object;
communicating information from said impulse radio to another impulse radio using UWB signals; and performing range finding to determine a range between said impulse radio relative to said another impulse radio used for determining the location of the object.

39. The method of claim 38, further comprising:

processing said at least one of back scattering signal returns and forward scattering signal returns to determine the movement of said object.

40. The method of claims 39, further comprising:

triggering a condition when said object penetrates a boundary.

41. The method of claim 38, wherein said location is used to determine the position of said object.

42. A method of UWB signaling, comprising:

transmitting at an impulse radio UWB radar signals that reflect off an object;

communicating information from said impulse radio to another impulse radio using UWB signals; and performing range finding to determine a range between said impulse radio relative to said another impulse radio used for determining the location of the object.

43. The method of claim 42, further comprising:

receiving signal returns of said transmitted UWB radar signals.

44. The method of claim 42, wherein said signal returns comprise at least one of back scattering signal returns and forward scattering signal returns.

45. The method of claim 42, further comprising:

triggering a condition when said object penetrates a boundary.

46. The method of claim 42, wherein said location is used to determine the position of said object.

* * * * *